United States Patent [19]
Furst

[11] Patent Number: 5,844,328
[45] Date of Patent: Dec. 1, 1998

[54] BACKUP DEVICE FOR ELECTRIC APPLIANCE

[76] Inventor: Robert Furst, 39 Richard Sweet Dr., Woodbridge, Conn. 06525

[21] Appl. No.: 417,741

[22] Filed: Apr. 6, 1995

[51] Int. Cl.$^6$ ....................................................... H02J 7/00
[52] U.S. Cl. ................................ 307/66; 307/64; 307/65
[58] Field of Search ................................ 307/64, 65, 66; 320/48, 2; 361/118

[56] References Cited

U.S. PATENT DOCUMENTS

| | | | |
|---|---|---|---|
| 3,683,198 | 8/1972 | Thode | 307/66 |
| 4,366,390 | 12/1982 | Bathmann | 307/66 |
| 4,471,233 | 9/1984 | Roberts | 307/66 |
| 4,673,826 | 6/1987 | Masson | 307/66 |
| 4,703,191 | 10/1987 | Ferguson | 307/64 |
| 4,939,432 | 7/1990 | Tsai | 318/124 |
| 4,946,096 | 8/1990 | Ballard et al. | 236/11 |
| 5,315,533 | 5/1994 | Stich et al. | 364/480 |

*Primary Examiner*—William M. Shoop, Jr.
*Assistant Examiner*—Kim Lockett
*Attorney, Agent, or Firm*—Bachman & Lapointe, PC

[57] ABSTRACT

A backup power system for a structural appliance normally operated by a primary source of AC current through a primary circuit includes a backup battery; a charging circuit for connecting the primary source to the backup battery and including a battery charger for charging the backup battery; a backup circuit for connecting the backup battery to the appliance and including a converter for converting DC current from the backup battery to AC current for the appliance; and a switch interposed in the primary circuit and the backup circuit for selectively closing the primary circuit and opening the backup circuit during normal operation of the primary source, and for closing the backup circuit upon at least partial failure of the primary source so as to connect the backup battery to the appliance through the converter, whereby the backup battery is charged and isolated from the appliance during normal operation of the primary source, and the backup battery is connected through the converter to the appliance for supplying AC current to the appliance upon failure of the primary source.

15 Claims, 1 Drawing Sheet

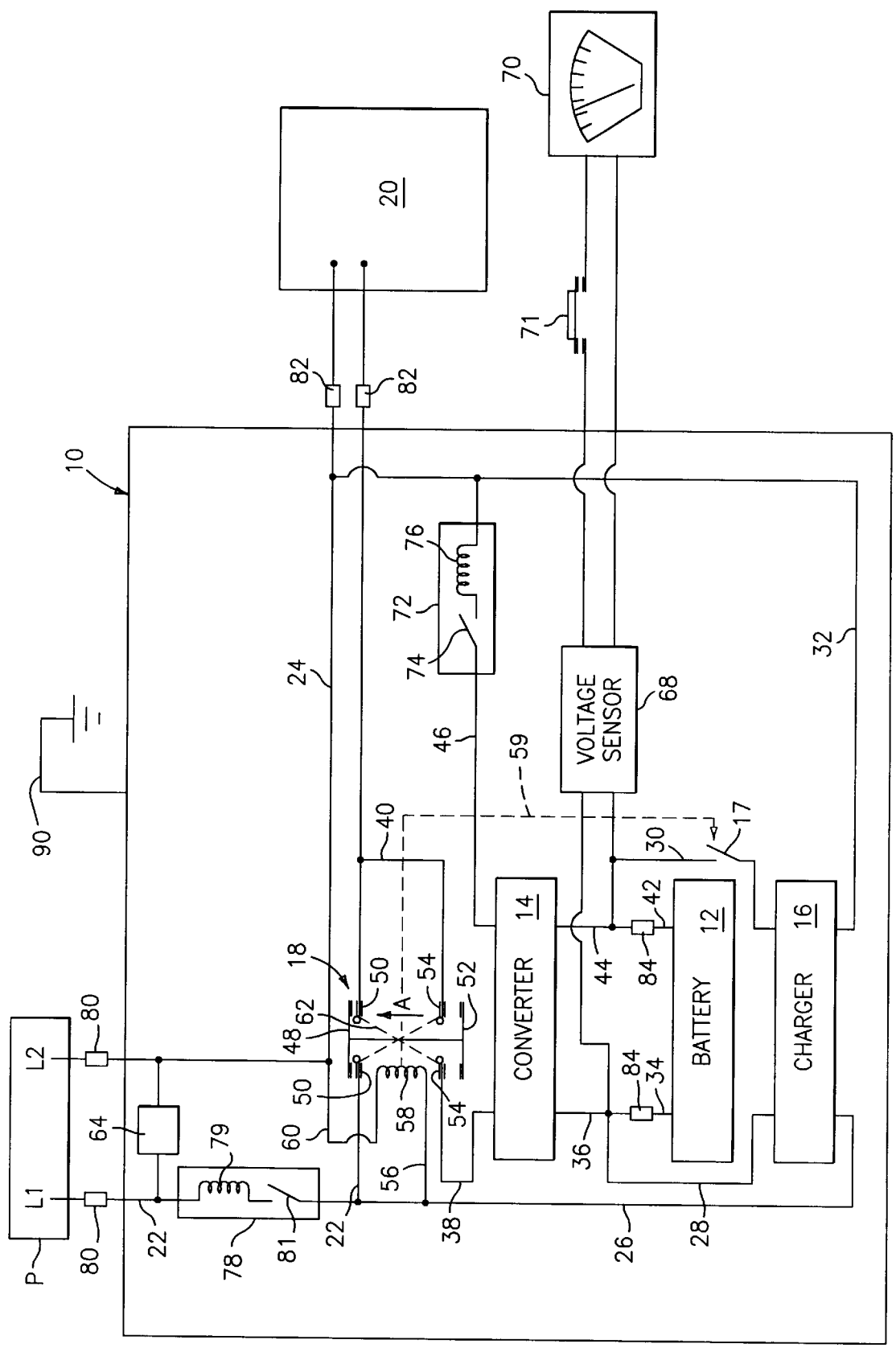

BACKUP DEVICE FOR ELECTRIC APPLIANCE

BACKGROUND OF THE INVENTION

The invention relates to a backup power system for a structural or household appliance such as electric water pumps, electrically operated oil or gas furnaces, blower motors and the like.

Electrically operated water pumps are widely used to supply water for household and other needs to homes, structures and other end uses in geographical locations where city water is not available. Although such water pumps do generally provide adequate and satisfactory supply of water as desired, problems arise during power outages or blackouts caused by storms, accidents, and countless other circumstances. During a blackout or power outage, the primary source of power to the electric water pump is interrupted. Thus, the household or structure or other end use which is supplied with water by the water pump has a greatly reduced or entirely eliminated source of water during such a blackout or power outage. Numerous other household or structural appliances are likewise paralyzed during power outages, including other types of pumps, electrically operated oil and gas furnaces, blower motors for heating systems, electric garage door openers and numerous other devices.

Gas or oil operated generators are well known for supplying emergency electric current when needed. However, such generators must be started by the user and frequently create a large amount of noise. Further, conventional generators require maintenance and a sufficient supply of fuel for the generator must be provided.

It is clear, therefore, that the need exists for a reliable, quiet and efficient source of backup power for structural appliances such as electric pumps and the like.

It is therefore the primary object of the present invention to provide a backup power system for structural appliances which remains charged and ready for use at all times and which is automatically switched to power the desired appliance when needed.

It is a further object of the present invention to provide such an apparatus which is quiet in operation and which requires minimal maintenance.

Other objects and advantages of the present invention will appear hereinbelow.

SUMMARY OF THE INVENTION

In accordance with the present invention, the foregoing objects and advantages, and others, are readily attained.

In accordance with the invention, a backup power system is provided for a structural appliance normally operated by a primary source of AC current through a primary circuit, wherein the backup power system comprises a backup battery; charging circuit means for connecting said primary source to said backup battery and including battery charging means for charging said backup battery; backup circuit means for connecting said backup battery to said appliance and including converter means for converting DC current from said backup battery to AC current for said appliance; and switch means interposed in said primary circuit and said backup circuit means for selectively closing said primary circuit and opening said backup circuit means during normal operation of said primary source, and for closing said backup circuit means upon at least partial failure of said primary source so as to connect said backup battery to said appliance through said converter, whereby said backup battery is charged and isolated from said appliance during normal operation of said primary source, and said backup battery is connected through said converter to said appliance for supplying AC current to said appliance upon failure of said primary source.

According to the invention, the system may preferably also include surge protection means for protecting the system from surges in the primary source of power which exceed a predetermined level.

According to still another preferred embodiment of the invention, the backup apparatus is provided as a separate element adapted for connection to the primary power source, the appliance to be backed up, and the backup power source such as a battery or the like. In accordance with this embodiment, the backup apparatus according to the invention comprises backup connector means for connecting to said rechargeable DC current backup power source; primary source connector means for connecting to said primary source of AC current; appliance connector means for connecting to said appliance; primary circuit means connected between said primary source connector means and said appliance connector means; backup circuit means connected between said backup connector means and said appliance connector means and including converter means for converting DC current to AC current; battery charging means connected to said primary source connector means and said backup connector means for charging said rechargeable DC current backup power source; switch means associated with said primary circuit means and said backup circuit means for selectively closing said primary circuit means and opening said backup circuit means while a current is received at said primary source connector means, and for closing said backup circuit means upon interruption of said current in said primary source connector means.

BRIEF DESCRIPTION OF THE DRAWINGS

A detailed description of the preferred embodiments of the invention follows, with reference to the attached drawing which shows a schematic illustration of a backup device according to the present invention.

DETAILED DESCRIPTION

The invention relates to a backup device for an electric appliance. Numerous household or structural appliances are operated by electric power. These include electrically operated water pumps, oil or gas furnaces, blower motors for forced air heating systems, and numerous other devices.

In the event of a blackout or other power failure, appliances such as those discussed above are completely inoperative, thereby severely inhibiting the normal conveniences and/or necessities available in the household or other structure. For example, structures having water supplied from a well or other source and pumped by an electrically operated water pump are without water during such an interruption in power. This precludes the possibility, for example, of flushing toilets, taking showers and numerous other functions which are at least convenient, and, in some cases necessary. Oil and gas furnaces which rely upon electric current for starting and maintaining combustion as well as various other functions are also disabled by an outage of power. Further, forced air heating systems are inoperative due to the lack of power to drive the blower motors of same. Thus, some structures in a blackout may be deprived of water, heat, or both. It is the primary object of the present invention to provide a device which reduces the inconvenience and hazard of such power outages.

As used herein, a structural appliance includes any such appliance as discussed above which provides a desirable or necessary function to a house, apartment building, or other structure. The typical primary power source for such structural appliances is the household or structural power which is typically an AC current delivered from a local substation or other source. Thus, in order to properly operate during a power outage, these devices must be provided with a replacement source of AC current.

Referring to the attached drawing, a preferred embodiment of the present invention will be described. In accordance with the invention, the backup device, generally referred to herein by reference numeral 10, includes a backup battery 12, a converter 14, a battery charger 16, a switching element 18, and circuitry for connecting each element in accordance with the present invention and as will be further discussed below.

In accordance with the invention, apparatus 10 serves to monitor current supplied by the primary source of power in the structure and, upon failure of same, switches backup battery 12 into connection with an appliance 20 to be powered, and makes such a connection through a converter 14 for converting the DC current from battery 12 to AC current for properly operating appliance 20.

Backup battery 12 may be any of a wide variety of suitable batteries which are well known and widely available on the market. In accordance with the invention, backup battery 12 is preferably a rechargeable battery which provides a suitable supply of power for operating the appliance 20 which is to be backed up. According to the invention, battery 12 and device 10 may be configured to provide varying levels of backup power depending upon the appliance 20 to be run. For example, device 10 and battery 12 may be selected to provide 110 volts at a current of 5 amps which is suitable for backing up electric water pumps, blower motors and other systems typically found in a conventional household in the United States, or may provide 220 volts at a current of 10 amps for 220 volt single phase applications as desired. Of course, numerous other configurations of the present invention may also be provided depending upon appliance 20.

In accordance with a preferred embodiment of the present invention, the backup battery 12 may suitably be a 12 volt battery rated for current in the range of, for example, 17–38 milli-amps. Lead-acid batteries are particularly suitable although, as may be appreciated by one skilled in the art, numerous other alternatives are available and readily useful with the present invention. Rechargeability of battery 12 is desirable in accordance with the invention. Also, multiple batteries may be arranged within the device, if desired, for providing additional voltage and/or duration of power supplied by device 10 to appliance 20.

Converter 14 may be any of numerous conventional and well known converter devices for converting DC current to AC current as desired. A specific example of a suitable converter is Model PV300 supplied by Tripp Lite and configured to convert 12V DC to 110 AC, although, as appreciated by a person of ordinary skill in the art, numerous other alternatives are available and readily useful in accordance with the present invention.

Charger 16 may likewise be any suitable or conventionally available battery charger for maintaining battery 12 in a charged state using power supplied by the primary source of power P for the household or structure. A specific example of a suitable charger 16 is Model SE-112S provided by Schumacher under the Registered Trademark MITY-MITE, although, as with other elements of the invention, numerous alternative devices exist which could be readily substituted by a person of ordinary skill in the art for suitable use in accordance with the present invention.

Still referring specifically to the attached Figure, a primary power source indicated at P ends in lines L1, L2 to which device 10 is connected. In accordance with the invention, primary power source P controls appliance 20 through a primary current circuit including line L1 connected through line 22 and switch element 18 to appliance 20, and from appliance 20 through line 24 to line L2 (ground). Through the primary current circuit, appliance 20 is normally operated so long as primary power source P is not subject to failure or other interruption.

Charger 16 is preferably connected to primary power source P, in accordance with the invention, for charging backup battery 12 as desired. This is accomplished in accordance with the invention through a charging circuit starting with line L1 from primary source P and connected through lines 22 and 26 to charger 16, from charger 16 to battery 12 through line 28, from battery 12 back to charger 16 through line 30, and from charger 16 back to line L2 (ground) through line 32 and line 24. Thus, during normal operation of primary source P, the charging circuit of the present invention keeps battery 12 charged through charger 16 so that apparatus 10 is operative to provide power to appliance 20 when needed. The charging circuit preferably also includes a switch element 17 for opening and closing the charging circuit as will be described further below. Switch 17 serves advantageously to allow charger 16 to be disconnected when battery 12 is in use.

In accordance with the invention, battery 12 is preferably connected to appliance 20 through a backup circuit passing through switch element 18 for powering appliance 20 when needed. In accordance with the invention, one terminal 34 of battery 12 is preferably connected to converter 14 through line 36. Converter 14 is preferably connected through line 38 to switch element 18 and from switch element 18 through line 40 to appliance 20. A second terminal 42 of battery 12 is preferably connected through line 44 to converter 14 and thence from converter 14 through line 46 to appliance 20. Thus, when switch element 18 is positioned to the proper position as will be discussed in detail below, battery 12 provides power through converter 14 to appliance 20 for operating same when needed, for example, upon the failure or other interruption of power from primary source P.

Switch element 18 in accordance with the invention is preferably a contactor device having a first bridge element 48 for closing the primary circuit, specifically for connecting line 22 to appliance 20, during normal operation of appliance 20 by primary power source P. In the normal operating position as shown in the drawing, bridge element 48 contacts contact elements 50 to close the primary current circuit as desired. In further accordance with the invention, switch element 18 preferably has a second bridge element 52 for closing the backup circuit, specifically for connecting line 38 to appliance 20 by contacting contact elements 54 all in accordance with the present invention.

As illustrated by arrow A in the drawing, switch element 18 is movable or positionable between the normal operation position illustrated in the drawing and a displaced position wherein switch element 18 is displaced in the direction of arrow A so that bridge element 52 contacts contact elements 54 and bridge element 48 is removed from contact with contact elements 50. Thus, movement of switch element 18 between the normal operating position illustrated in the drawing and the backup position wherein bridge element 52 contacts contact elements 54 serves to switch the source of power for appliance 20 between primary source P and backup battery 12 as desired.

In further accordance with the invention, a relay circuit is also preferably provided for controlling switch element 18 responsive to current provided by primary source P. In accordance with the invention, the relay circuit preferably is connected from line L1 out of primary source P to line 56 leading to a relay coil 58 which is operatively associated with switch element 18. The relay circuit, in accordance with the invention, preferably continues from relay coil 58 through line 60 and back to line L2 of primary source P (ground). During normal operation of primary source P, current from line L1 to line L2 serves to energize relay coil 58 and thereby displace switch element 18 in the direction opposite to arrow A to the normal operating position shown in the drawing.

In further accordance with the invention, switch element 18 is preferably provided with biasing means such as, for example, spring 62 for biasing switch element 18 in the direction of arrow A. The strength of spring 62 should be selected so that spring 62 is not sufficiently strong to overcome the force exerted by relay coil 58 when coil 58 is sufficiently energized. Thus, in accordance with the present invention, during normal operation of primary source P, relay coil 58 is operative to bias switch element 18 against spring 62 into the normal operating position.

In further accordance with the invention, upon interruption of current supplied by primary source P, coil 58 is de-energized, and the force counter to spring element 62 is thereby removed. Thus, upon failure or interruption of current from primary source P, spring element 62 serves to displace switch element 18 in the direction of arrow A so as to open the primary circuit by breaking contact between bridge element 48 and contact elements 50, and to close the backup circuit by contacting bridge element 52 with contact elements 54.

Relay 58 may also preferably be operatively associated with switch 17 in the charging circuit as shown schematically at line 59. Relay 58 is preferably adapted to open switch 17 upon failure of primary source P so that charger 16 advantageously is disconnected when battery 12 is in use. Relay 58 is further preferably adapted to close switch 17 when primary source P returns to normal operation so as to close the charging circuit and recharge battery 12 as needed. Relay 58 may be operatively associated with switch 17 through any conventional means well known to one of ordinary skill in the art.

It should of course be noted that numerous other arrangements of switch element 18 may be used in accordance with the invention for providing the normal operating position and switching to the backup position upon failure of primary source P as desired. Further, spring 62 may be replaced by any other suitable biasing element as would be well known to one of ordinary skill in the art all in accordance with the present invention.

Thus provided is a backup device 10 for providing rechargeable backup AC current for appliance 20 in the event of an interruption in primary source P. Advantageously, backup device 10 serves to keep backup battery 12 in a charged state for reliable backing up of appliance 20 when needed. Further, when primary source P returns to normal operation, coil 58 is again energized and thereby moves switch element 18 to the normal operating position shown in the drawing. Thus, after the failure in primary power is terminated and normal power returns to the structure in question, appliance 20 is again powered from primary source P and battery 12 is recharged for the next use.

In accordance with a preferred embodiment of the invention, backup device 10 may be provided with surge protection means for protecting the various circuitry and elements of device 10 from surges exceeding a predetermined safety level. In accordance with the invention, the surge protection device may comprise a varistor 64 such as, for example, a metal oxide varistor, connected between lines L1 and L2 from primary source P. Varistor 64 is preferably connected to primary source P in parallel to the circuitry of device 10. Varistor 64 in accordance with the invention is preferably adapted to reduce resistance to a nominal amount upon receiving a surge which exceeds the predetermined level. Thus, in accordance with the invention, varistor 64 serves to route current from line L1 away from device 10 to line L2 (ground) thereby protecting device 10 from damage due to such a surge.

In accordance with another embodiment of the invention, the backup device 10 may be provided with a voltage display and sensor for indicating the charge of backup battery 12 so that the charged state of backup battery 12 can be monitored and verified. In accordance with this embodiment of the invention, a voltage sensor 68 may be connected to the terminals 34, 42 of battery 12 for sensing the voltage of battery 12 and conveying same to a voltage display 70 which may preferably be positioned in a remote location. Thus, backup device 10 may be positioned for example in proximity to appliance 20 while voltage display 70 is in a more convenient position for monitoring the charged state of backup battery 12 all desirably and advantageously in accordance with the present invention. It should of course be noted that voltage sensor 68 and voltage display 70 may alternatively be a single unit positioned either remotely or locally with respect to backup device 10 and/or appliance 20. Further, numerous types of voltage sensors and displays are available and well known to the person of ordinary skill in the art. Thus, any suitable voltage sensor and/or voltage display unit may be used in accordance with the present invention.

In further accordance with this embodiment of the invention, a switch 71, preferably a push button-type switch, may be provided for operating sensor 68 and display 70 so that the load from these elements, albeit small, is not continuously applied to battery 12. Switch 71 advantageously allows display 70 and sensor 68 to be energized when desired. Switch 71 may preferably be positioned on or in close proximity to display 70, and is preferably biased to an open position so that display 70 and sensor 68 are activated only so long as switch 71 is held in a closed position.

In accordance with an alternative embodiment of the invention, a switch and indicator member 72 may be provided in the backup circuit, for example along line 46 as shown. Member 72 serves advantageously in accordance with the invention to allow battery 12 to be disconnected from appliance 20 if desired, regardless of the position of switch 18. This is desirable to allow device 10 to be turned off if desired even if primary source P has failed. This may be useful for example if it is desired to conserve the power from battery 12 for a later time, to provide emergency shut off of appliance 20 if needed, for initial installation of device 10, or for numerous other circumstances. Member 72 may preferably include a toggle switch member 74 which is conventionally designed for positioning or switching between an open and a closed position, and a pilot lamp 76 which is activated and visible where the backup circuit is closed (i.e., switch 18 is in the backup position and switch 74 is closed). Lamp 76 advantageously serves to indicate current in the backup circuit indicative of battery 12 powering appliance 20.

In further accordance with the above embodiment of the invention, an additional switch and indicator member 78 may be provided in the primary circuit, for example off of line L2 as shown in the drawing. Member 78 may preferably have a structure similar to that of member 72. Member 78 in accordance with the invention serves to provide an indication of current in the primary circuit, for example lighting of lamp 79, which indicates that primary source P is powering appliance 20, and may also preferably allow the closing or opening of the primary circuit through a switch 81, to stop primary source P from powering appliance 20 if desired.

It should be noted, of course, that either or both of members 72 and 78 could be provided in accordance with the invention, and could include a switch member or pilot lamp indicator or both in accordance with the present invention. It is preferred, however, that both members 72 and 78 be provided, each including a switch and lamp, so that both primary source P and battery 12 may be disconnected from appliance 20 if for example it is desired to stop operation of appliance 20, and so that a live circuit is readily indicated.

In accordance with the invention, device 10 may be directly wired into the structural circuitry of the home or other site in which it is to be used. Alternatively, device 10 may be provided as a separate assembly having primary source connectors 80, appliance connectors 82, and battery connectors 84 for connecting to respective elements as desired. According to the invention, connectors 80, 82, 84 may be used to readily install device 10 in existing circuitry of the structure and primary source P. It is also noted that, advantageously, battery connectors 84 allow battery 12 to be disconnected and replaced, if desired or necessary, without requiring complicated disassembly of device 10. Connectors 80, 82, 84 may suitably be any of numerous known and conventional electric connectors, the particular structure of which forms no part of the present invention.

Device 10 may also preferably include an additional ground 90, specifically a green or earth ground, for grounding device 10 as shown and further providing for the safe use of device 10 in accordance with the invention.

It should be noted that the present invention provides several distinct advantages in comparison to conventional backup power systems which are available. For example, one conventional source of backup power is a generator which typically runs on gasoline or other combustion fuel. A primary characteristic of the operation of such device is the noise which typically accompanies the combustion engine. Furthermore, care must be taken to ensure that a suitable source of fuel exists for the generator, and some steps must generally be taken to start the generator so as to provide the backup source of power. In accordance with the invention, each of these disadvantages is overcome. Specifically, backup battery 12 is maintained in a charged state through the charging circuit and charger 16 of the present invention, operation of battery 12 is silent and thereby preferable over the noise typically accompanying operation of a conventional generator, and no active steps must be taken to switch to battery 12 due to the function of switch element 18 and the backup circuit accompanying backup device 10 in accordance with the present invention. Additionally, the device 10 of the present invention does not require the potentially hazardous storage of combustible fuels as required with a conventional generator.

As set forth above, an alternative embodiment of the invention resides in the provision of a plurality of backup batteries so as to provide higher voltage for backing up appliances requiring a larger amount of starting power. In accordance with the invention, two backup devices 10 each having a 12 volt battery may be provided so as to provide 220 volts of starting power at 10 amps. This is readily accomplished through simple duplication of circuitry and modifications well within the skill of one of ordinary skill in the art.

It should be noted that the backup device of the present invention could suitably be used to provide backup power for a wide variety of appliances. It is specifically contemplated and particularly advantageous in accordance with the invention to provide such backup devices for use with electrically operated water pumps including subpumps located beneath ground in wells, pumps positioned remotely from wells for operating same, pumps for removing excess water for example from basements, and the like. A further particularly advantageous application of the backup device of the present invention is in conjunction with oil and/or gas furnaces which require electric current to provide initial start-up and continuous running of same. These applications are particularly advantageous for use in providing uninterrupted supply of water and/or heat in the event of a blackout, power outage or other interruption in power.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An electric pump system including a backup power system, comprising:

an electric pump;

a primary source of AC current connected to said electric pump through a primary circuit;

a backup battery;

charging circuit means for connecting said primary source to said backup battery and including battery charging means for charging said backup battery;

backup circuit means for connecting said backup battery to said electric pump and including converter means for converting DC current from said backup battery to AC current for said appliance;

first switch means interposed in said primary circuit and said backup circuit means for selectively closing and primary circuit and opening said backup circuit means during normal operation of said primary source, and for closing said backup circuit means upon at least partial failure of said primary source so as to connect said backup battery to said electric pump through said converter, whereby said backup battery is charged and isolated from said electric pump during normal operation of said primary source, and said backup battery is connected through said converter to said electric pump for supplying AC current to said electric pump upon failure of said primary source, wherein said switch means comprises a switch element positioned in series along said primary circuit for connecting said primary source to said electric pump, and in series along said backup battery circuit means, and wherein said switch means is actuable between a normal position wherein said primary circuit is closed and said backup circuit means is open, and a backup position wherein said backup circuit means is closed and said primary circuit is open; and a second switch positioned in said charging circuit means a switchable between a closed position wherein said charging circuit means is operative and an open position wherein said battery charging means is disconnected from said backup battery; and wherein said first switch means comprises means for positioning said second switch in said open position when said backup circuit means is closed, whereby said battery charging means is disconnected from said backup battery when said backup battery is connected to said appliance.

2. A system according to claim 1, further comprising voltage sensing means connected to said backup battery and voltage display means connected to said sensing means for displaying a voltage of said backup battery whereby said voltage of said backup battery can be monitored.

3. A system according to claim 2, wherein said display means is positioned remote from said backup battery whereby said voltage of said backup battery can be monitored from a remote position.

4. A system according to claim 2, further comprising switch means for actuating said display means, said switch means being biased toward an open position.

5. A system according to claim 1, further comprising surge protection means for protecting said system from surges in said primary source exceeding a predetermined level.

6. A system according to claim 5, wherein said surge protection means comprises a metal oxide varistor connected to said primary source in parallel to said system, and adapted to direct surges exceeding said predetermined level away from said system to ground.

7. A system according to claim 1, wherein said switch means further comprises a relay circuit connected to said primary source and adapted to position said switch element to said normal position responsive to current from said primary source, and wherein said switch element further comprises biasing means for switching said switch element to said backup position responsive to interruption in current from said primary source.

8. A system according to claim 7, wherein said relay circuit is connected directly to said primary source so that said relay circuit returns said switch element to said normal position upon return of said primary source to normal operation after failure, whereby said system automatically resets to normal operation and charging of said backup battery when said primary source returns to normal operation.

9. A system according to claim 14, further comprising primary circuit switch means connected in said primary circuit and switchable between a closed position and an open position, and primary circuit indicator means connected in said primary circuit for indicating current in said primary circuit.

10. A backup apparatus for connecting a rechargeable DC current backup power source to a structural appliance which is normally operated by a primary source of AC current, the backup apparatus comprising:

primary circuit means;

backup circuit means including convertor means for converting DC current to AC current;

backup connector means for connecting said backup circuit means to said rechargeable DC current backup power source;

primary source connector means for connecting said primary circuit means to said primary source of AC current;

appliance connector means for connecting said backup circuit means and said primary circuit means to said appliance wherein said appliance connector means comprises means for connecting said backup circuit means and said primary circuit means to an appliance selected from the group consisting of electric pumps, electrically operated oil or gas furnaces, blower motors and combinations thereof;

battery charging means connected to said primary source connector means and said backup connector means for charging said rechargeable DC current backup power source;

first switch means associated with said primary circuit means and said backup circuit means for selectively closing said primary circuit means and opening said backup circuit means while a current is received at said primary source connector means, and for closing said backup circuit means upon interruption of said current in said primary source connector means;

wherein said switch means further comprises a switch element positionable between a normal position wherein said primary circuit means is closed and said backup circuit means is open, and a backup position wherein said backup circuit means is closed and said primary circuit is open, and a relay circuit connected to said primary source connector means and adapted to position said switch element to said normal position responsive to current through said primary source connector means, wherein said switch element further comprises means for biasing said switch element to said backup position responsive to interruption in said current, and wherein said switch element comprises a switch body, a first bridge element attached to said switch body and positioned to close said primary circuit means in said normal position and a second bridge element attached to said switch body and positioned to close said backup circuit means in said backup position; and a second switch positioned in said battery charging means and switchable between a closed position wherein said battery charging means is operative and an open position wherein said battery charging mean is disconected from said backup connector means; and wherein said first switch means comprises means for positioning said second switch in said open position when said backup circuit means is closed, whereby said battery charging means is disconnected from said backup connector means when said backup circuit is closed.

11. An apparatus according to claim 10, further comprising surge protection means connected to said primary source connector means for protecting said apparatus from surges in current exceeding a predetermined level through said primary source connector means.

12. An apparatus according to claim 11, wherein said surge protection means comprises a metal oxide varistor connected to said primary source connector means in parallel to said apparatus, said metal oxide varistor being adapted to direct surges exceeding said predetermined level away from said apparatus.

13. A system according to claim 10, wherein said relay circuit is connected directly to said primary source connector means so that said relay circuit returns said switch element to said normal position upon return of said current to said primary source connector means.

14. A backup power system for a structural appliance normally operated by a primary source of AC current through a primary circuit, comprising:

a backup battery;

charging circuit means for connecting said primary source to said backup battery and including battery charging means for charging said backup battery;

backup circuit means for connecting said backup battery to said appliance and including converter means for converting DC current from said backup battery to AC current for said appliance, wherein said backup circuit means comprises means for connecting said backup battery to an appliance selected from the group consisting of electric pumps, electrically operated oil or gas furnaces, blower motors and combinations thereof;

first switch means interposed in said primary circuit and said backup circuit means for selectively closing said primary circuit and opening said backup circuit means during normal operation of said primary source, and for closing said backup circuit means upon at least partial failure of said primary source so as to connect said backup battery to said appliance through said converter; whereby said backup battery is charged and isolated from said appliance during normal operation of said primary source, and said backup battery is connected through said converter to said appliance for supplying AC current to said appliance upon failure of said primary source;

backup circuit switch means connected in said backup circuit and switchable between a closed position and an open position;

backup circuit indicator means connected in said backup circuit for indicating current in said backup circuit;

voltage sensing means connected to said backup battery, and voltage display means connected to said sensing means for displaying a voltage of said backup battery whereby said voltage of said backup battery can be monitored, wherein said display means is positioned remote from said backup battery whereby said voltage of said backup battery can be monitored from a remote position;

display switch means for actuating said display means, said switch means being biased toward an open position; and a second switch positioned in said charging circuit means and switchable between a closed position wherein said charging circuit means is operative and an open position wherein said battery charging means is disconnected from said backup battery; and wherein said first switch means comprises means for positioning said second switch in said open position when said backup circuit means is closed, whereby said battery charging means is disconnected from said backup battery when said backup battery is connected to said appliance.

15. A backup power system for a structural appliance normally operated by a primary source of AC current through a primary circuit, comprising:

a backup battery;

charging circuit means for connecting said primary source to said backup battery and including battery charging means for charging said backup battery;

backup circuit means for connecting said backup battery to said appliance and including converter means for converting DC current from said backup battery to AC current for said appliance, wherein said backup circuit means comprises means for connecting said backup battery to an appliance selected from the group consisting of electric pumps, electrically operated oil or gas furnaces, blower motors and combinations thereof;

first switch means interposed in said primary circuit and said backup circuit means for selectively closing said primary circuit and opening said backup circuit means during normal operation of said primary source, and for closing said backup circuit means upon at least partial failure of said primary source so as to connect said backup battery to said appliance through said converter; whereby said backup battery is charged and isolated from said appliance during normal operation of said primary source, and said backup battery is connected through said converter to said appliance for supplying AC current to said appliance upon failure of said primary source; and a second switch positioned in said charging circuit means and switchable between a closed position wherein said charging circuit means is operative and an open position wherein said battery charging means is disconnected from said backup battery; and wherein said first switch means comprises means for positioning said second switch in said open position when said backup circuit means is closed, whereby said battery charging means is disconnected from said backup battery when said backup battery is connected to said appliance.

* * * * *

UNITED STATES PATENT AND TRADEMARK OFFICE
CERTIFICATE OF CORRECTION

PATENT NO. : 5,844,328
DATED : December 1, 1998
INVENTOR(S) : Robert Furst It is certified that error appears in the above-identified patent and that said Letters Patent is hereby corrected as shown below:

In column 8, claim 1, line 53, delete "and" and insert --said-- in its place.

In column 9, claim 1, line 8, delete "a" (first occurrence) and insert --and-- in its place.

In column 10, claim 10, line 45, delete "mean" and insert --means-- in its place; and delete "disconected" and insert --disconnected-- in its place Signed and Sealed this Twenty-seventh Day of July, 1999

Attest:

Q. TODD DICKINSON

*Attesting Officer*     *Acting Commissioner of Patents and Trademarks*